Feb. 18, 1941.   M. WAGNER   2,232,154
AUTOMOBILE VEHICLE
Filed April 15, 1938   2 Sheets-Sheet 2

INVENTOR:
Max Wagner

Patented Feb. 18, 1941

2,232,154

UNITED STATES PATENT OFFICE 2,232,154

AUTOMOBILE VEHICLE

Max Wagner, Stuttgart, Germany, assignor to Daimler-Benz Aktiengesellschaft, Stuttgart-Unterturkheim, Germany, a corporation of Germany Application April 15, 1938, Serial No. 202,157
In Germany April 20, 1937

34 Claims. (Cl. 180—70)

This invention relates to motor vehicles and is particularly concerned with sport cars, racing cars, and the like, and is a continuation in part of my copending application Serial No. 56,916, filed December 31, 1935, now United States Patent No. 2,169,670, issued August 15, 1939.

In vehicles of the kind referred to, the seats are advantageously disposed at approximately the same level as, or lower than, the wheel centres, and between the engine and gearing and at the same level as, or lower than, either of the latter. Moreover, the gearing advantageously comprises both the change speed gearing and the axle gearing.

One object of the invention is to provide a structure wherein the driving shaft is laterally disposed on the vehicle or runs obliquely to such an extent that the low-set seats are avoided by the driving shaft.

A further object is to provide for an oblique mounting of the engine substantially in the central longitudinal plane of the chassis.

A further general object of the invention is to provide such a combination of chassis, drive and wheel suspension as to produce a vehicle having a particularly low centre of gravity together with favourable weight and space distribution, whereby high cornering stability, for example, is achieved.

An improvement due to the invention is that an optimum road position is achieved which is most advantageous for sport cars, racing cars and the like. Also, due to the lateral disposition of the driving shaft it is possible to arrange the driver's seat in the lowest position permitted by the necessary ground clearance, since the driver's feet are not obstructed by the said shaft. In this way, the centre of gravity of the vehicle is brought to the lowest possible level.

With an oblique setting of both the engine and driving shaft, it is possible to dispense with an intermediate gearing between such engine and shaft.

The foregoing and other features and objects will appear from the following description of the annexed drawings, wherein.

Figure 1:
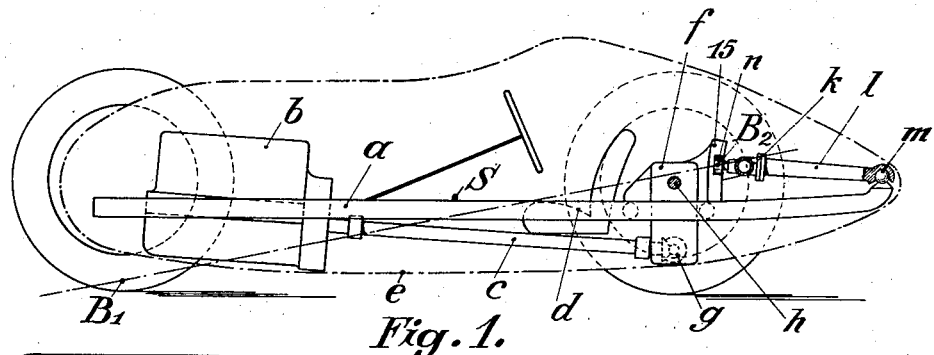
Figure 1 is a more or less diagrammatic side elevation of an improved automobile vehicle the rear axle part being in section on the line 1—1 of Figure 2.
Figure 2:
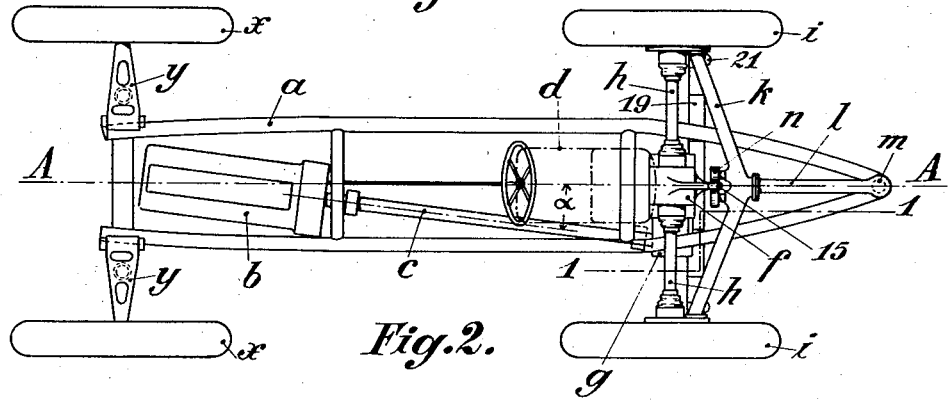
Figure 2 is a plan view of Figure 1.

In Figures 1 and 2, $a$ is the frame on which the engine $b$ is mounted substantially in the central longitudinal plane A—A of the vehicle but obliquely in relation to the longitudinal direction of the vehicle. The driving shaft $c$ extending obliquely in prolongation of the crank shaft makes an angle $\alpha$ with the longitudinal axis of the vehicle and passes laterally of the seat $d$. Thus the space in front of the latter is available for the driver's feet as far as the pan or bottom wall $e$. Thus, the seat $d$ can be arranged as low as is possible having regard to the said bottom $e$.

Figure 6:
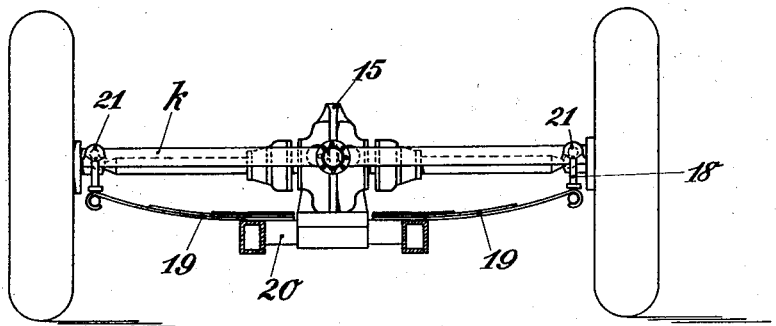
Figure 6 is a sectional elevation of a rear axle arrangement.

The gearing $f$, consisting of change-speed gearing and axle gearing, is mounted rigidly or elastically on the frame behind the seat. The shafts of the gearing are then arranged, as will be more fully described below, transversely of the direction of travel so that the gearing fits particularly advantageously, as to space, in the chassis frame. The driving shaft $c$, extending in a low position underneath the frame, drives the gearing $f$ by means of a laterally disposed bevel-wheel transmission $g$. The jointed axle shafts $h$, driven by the gearing cross the frame $a$ at the level of the wheel centres and above the longitudinal bearers of the frame. The rear wheels $i$ driven from the shafts $h$ are mounted upon a rigid axle $k$ which is pivotally connected by a ball joint $m$ to the rear end of the frame by means of a thrust stay $l$ rigidly connected to the said axle. Moreover, the axle $k$ is supported in the transverse direction by rubber rollers $n$ or by sliding blocks or the like, in guiding engagement with a guide device $15$ on the housing of the gearing. This rear end construction is more fully described and explained in my above identified copending application Serial No. 56,916, now United States Patent No. 2,169,670. The springing of the axle may be effected in any desired fashion, for example by means of leaf springs, helical springs, torsion springs, rubber springs or the like. Springing by leaf springs is illustrated by way of example in Figure 6 of the drawing. In this example, the leaf springs $19$ secured to the transverse bearers $20$ of the frame are suspended by the bolts $18$ from the eyes $21$ of the rear axle $k$.

Figure 7:
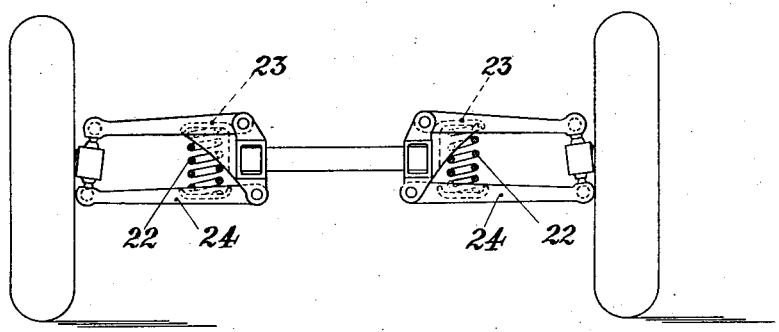
Figure 7 is a front elevation of a front axle arrangement.

The front wheels x are parallel-guided for example by means of two links y, Figure 2, disposed one above the other, so that the steering is free from centrifugal reactions. The axis of transverse oscillation thus extends from the point $B_1$, Figure 1, between the front wheels obliquely upwards to the point $B_2$ which is determined by the position of the guide rollers n. Since this axis of oscillation passes approximately through the centre of gravity S of the vehicle, high stability of the vehicle, in cornering is achieved. This characteristic is further enhanced by the low position of the centre of gravity which, in some cases, is brought lower than the wheel centres, as shown in the drawings. The springing of the front wheels is advantageously effected, as shown in Figure 7, by unguided helical springs 22 which abut against the mounting brackets 23 on the one hand and against the lower links 24 on the other hand. Instead of a rigid axle with the wheels driven by jointed shafts, use may also be made, for example, of swinging half axles.

Figure 3:
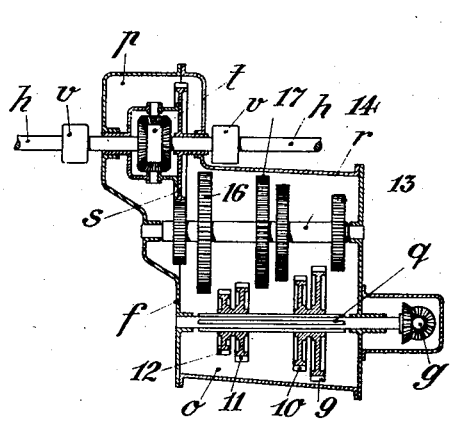
Figure 3 is a cross section of one construction of combined change speed and axle gearing suitable for being installed behind the driver's seat in Figures 1 and 2.
Figure 4:
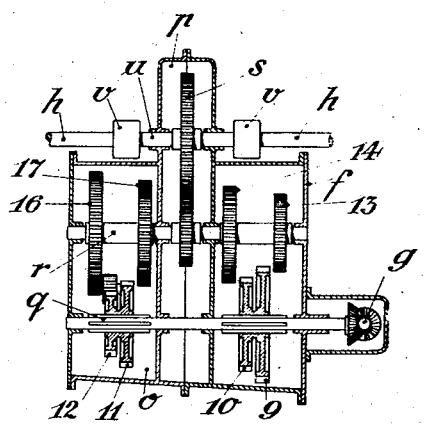
Figure 4 is a cross section of an alternative combination gearing.

Two examples of construction of the gearing indicated generally by the reference f in Figures 1 and 2 are shown diagrammatically in Figures 3 and 4. In these Figures, the said gearing is seen to comprise a change speed element o and an axle gearing element p. Principally the gearing possesses three lines of shaft located one above another, the lowest shaft q being driven by the driving shaft c through the bevel-wheel gearing g and carrying, for example, the displaceable wheels 9, 10, 11, 12 for the selective engagement of the various wheel pairs 9/13, 10/14, 11/17 and 12/16 arranged between the shafts q and r. The shaft r is connected by a permanently meshing wheel-pair s to a differential gearing t in Figure 3 and to a shaft u in Figure 4, no differential gearing being provided in the latter case. The wheel-axle shafts h are driven by Cardan joints v from the differential gearing t, Figure 3, or from the shaft u, Figure 4. The lateral drive can be used particularly advantageously by means of the transverse arrangement of the gearing shafts.

In Figure 3, as is evident from the drawing, the change-speed gearing o is located laterally outside the central longitudinal plane extending through the differential gearing t. In some cases, this arrangement has the advantage that, even with substantially laterally disposed driving shaft, the lateral distance between the bevel wheel g of the driving shaft c and the axle gearing p, t can be bridged in particularly appropriate fashion by the change-speed gearing. In contrast therewith the arrangement of Figure 4, wherein the gear wheels of the change-speed gearing are arranged approximately symmetrically in relation to the central longitudinal plane of the vehicle, has the advantage of a more uniform and favourable distribution of weight. In some cases, the axle gearing might also be disposed in front of or behind the change-speed gearing in the direction of travel.

Figure 5:
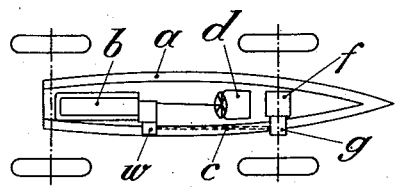
Figure 5 is a diagrammatic plan view to a smaller scale of a modification of Figures 1 and 2.

In the arrangement of Figure 5, the engine, as well as the driving shaft c, is located in the longitudinal direction of the vehicle, the engine approximately in the longitudinal central plane and the driving shaft c laterally out of the said plane. In this case, an intermediate gearing w, for example a pair of gear wheels, is necessary for bridging the lateral distance between the crank shaft of the engine and the driving shaft c.

In some cases, if account is taken of sufficient balancing of the weight, the engine might also be displaced laterally out of the longitudinal central plane of the vehicle so that the driving shaft extends, without the interposition of a special gearing between the engine and shaft, from the front to the rear laterally of the central longitudinal plane and, for example, inclined in relation to the longitudinal direction at a comparatively small angle only. Furthermore, the engine might be arranged in the longitudinal direction of the vehicle and the driving shaft obliquely to the longitudinal direction, for example, with the interposition of a bevel-wheel gearing. The invention is also applicable to vehicles with a rear engine and front-wheel or four-wheel drive.

While I have herein shown and described only certain embodiments of certain features of my present invention it is to be understood that they are to be regarded merely as illustrative and that I do not intend to limit myself thereto except as may be required by the claims which follow.

I claim:

1. In a vehicle, a forwardly positioned driving engine having a crank-shaft, a rearwardly positioned vertically extending axle-drive gearing, and a single seat centrally disposed in the transverse direction of the vehicle, positioned intermediate said engine and axle-drive gearing, the top of which lies in a substantially horizontal plane lying at least as low as the centers of said crank-shaft and axle-drive gearing.

2. In a vehicle, a forwardly positioned driving engine, rearwardly positioned speed-change and axle-drive gearing, a seat disposed substantially centrally in the transverse direction of said vehicle, intermediate said engine and, said speed-change and axle-drive gearing, and a drive-shaft interconnecting said engine and gearing in such a manner as to pass by alongside said seat outside the vertical central longitudinal plane of the vehicle.

3. In a vehicle, a forwardly positioned driving engine, a rearwardly positioned axle-drive gearing, a seat in said vehicle intermediate said engine and axle-drive gearing, and a drive-shaft interconnecting said engine and axle-drive gearing in such a manner as to pass by alongside said seat outside the central longitudinal plane of the vehicle and obliquely to the longitudinal axis of the vehicle.

4. In a vehicle, a forwardly positioned driving engine disposed in the central longitudinal plane of said vehicle, a rearwardly positioned axle-drive gearing, a seat in said vehicle intermediate said engine and axle-drive gearing, and a drive-shaft interconnecting said engine and axle-drive gearing in such a manner as to pass by alongside said seat outside of and laterally displaced from the central longitudinal plane of the vehicle.

5. In a vehicle, a forwardly positioned driving engine, a rearwardly positioned axle-drive gearing, a seat in said vehicle intermediate said engine and said axle-drive gearing, said seat and axle-drive gearing being centrally disposed in the transverse direction of said vehicle, and a drive-shaft interconnecting said engine and axle-drive gearing in such a manner as to pass by alongside of said seat outside the central longitudinal plane of the vehicle.

6. In a vehicle, a forwardly positioned driving engine having a crank-shaft, a rearwardly transversely positioned combined axle-drive and speed-change transmission, a seat intermediate said engine and said transmission, driven shafts interconnected with said transmission at the top thereof, and a drive-shaft interconnecting said crank-shaft with the bottom of said transmission and passing by alongside said seat outside the central longitudinal plane of the vehicle.

7. The combination according to claim 6, in which the engine and drive-shaft respectively are positioned and extend obliquely to the longitudinal axis of the vehicle.

8. The combination according to claim 6, in which said engine is disposed in the central longitudinal plane of said vehicle and said drive shaft is laterally displaced from said plane.

9. The combination according to claim 6, in which said seat and axle-drive gearing are centrally disposed in the transverse direction of said vehicle.

10. In a vehicle having a frame, wheels for said vehicle, means for interconnecting said wheels with said frame so that the axes of rotation thereof lie above said frame, a driving engine mounted on said frame, a speed-change transmission mounted on said frame so that at least a part thereof lies below said frame, a drive shaft extending obliquely to the longitudinal axis of the vehicle and below said frame, interconnecting said engine and transmission, and a seat mounted on said frame so that its top surface is at least as low as the top of said frame, whereby the center of gravity of said vehicle lies below the axis of rotation of said wheel.

11. The combination according to claim 10, in combination with axle-drive gearing forming a part of said transmission, and in which said seat lies intermediate said transmission and said engine.

12. In a vehicle having a frame, front wheels for said vehicle, a pair of parallel links on each side of said frame for guiding each front wheel relative thereto, rear wheels for said vehicle, a stiff axle interconnecting said rear wheels, means for vertically guiding said stiff axle relative to said frame, whereby the axis of transverse oscillation of said vehicle extends along a line from the mid-point between the contact of said front wheels with the ground and the connection between said stiff axle and frame at the vertical guiding means, a forwardly positioned engine having a crank-shaft mounted on said frame, a rearwardly positioned vertically extending axle-drive gearing mounted on said frame, and a seat intermediate said engine and axle-drive gearing, the top of which lies in a substantially horizontal plane at least as low as the centers of said crank-shaft and axle-drive gearing.

13. The combination according to claim 12, in combination with a drive shaft interconnecting said engine and said gearing, said drive shaft extending obliquely to the longitudinal axis of said vehicle and alongside said seat.

14. The combination according to claim 12, in combination with a drive-shaft interconnecting said engine and said gearing, said drive-shaft being laterally displaced from the central longitudinal plane of said vehicle and extending alongside said seat.

15. In a power vehicle, vehicle wheels, a frame positioned substantially lower than the wheel centers, an engine positioned at the front of the vehicle having a crank shaft lying lower than the wheel centers, a driving gear centrally positioned at the rear of the vehicle and substantially lower than the wheel centers, and a seat centrally positioned in the transverse direction of the vehicle and mounted between the engine and the driving gear, the upper seating surface of which lies substantially lower than the wheel centers.

16. The combination according to claim 15, in combination with a drive shaft interconnecting the engine and the driving gear, which extends substantially lower than the wheel centers and laterally alongside the seat.

17. In a power vehicle, vehicle wheels, a frame positioned substantially lower than the wheel centers, an engine having a crank shaft lying lower than the wheel centers, a driving gear positioned substantially lower than the wheel centers, and a seat positioned in the longitudinal direction of the vehicle between the engine and the driving gear, the upper seating surface of which lies substantially lower than the wheel centers, the masses of the frame, engine, driving gear and seat being positioned so low relatively to the frame that the center of gravity of the vehicle lies below the wheel centers.

18. In a power vehicle, vehicle wheels, a frame positioned substantially lower than the wheel centers, an engine having a crank-shaft lying lower than the wheel centers, a driving gear positioned substantially lower than the wheel centers, a seat positioned in the longitudinal direction of the vehicle between the engine and the driving gear, the upper seating surface of which lies substantially lower than the wheel centers, and a drive shaft for interconnecting the engine and the driving gear, which extends substantially lower than the wheel centers and laterally alongside the seat, the masses of the frame, engine, driving gear, driving shaft and seat being positioned so low relatively to the frame, that the center of gravity of the vehicle lies below the wheel centers.

19. In a power vehicle, vehicle wheels, an engine positioned at one end of the vehicle, a driving gear positioned at the other end of the vehicle, a seat positioned in the longitudinal direction of the vehicle between the engine and the driving gear, whose seating surface lies lower than the wheel centers, a drive shaft interconnecting the engine and the driving gear, passing alongside the seat and extending lower than the wheel centers, the masses of the assembled parts lying so low that the center of gravity of the vehicle is beneath the wheel centers.

20. The combination according to claim 19, wherein the engine lies substantially in the central longitudinal plane of the vehicle, and said drive shaft connecting the engine to the driving gear extends obliquely to the longitudinal direction of the vehicle in such a manner that it passes laterally alongside the seat.

21. In a power vehicle, vehicle wheels, an engine, a driving gear, a seat centrally positioned in the transverse direction of the vehicle and mounted between the engine and the driving gear in the longitudinal direction of the vehicle, whose seating surface does not lie higher than the wheel centers, a drive shaft connecting the engine with the driving gear, which extends lower than the wheel centers and laterally of the seat outside of the longitudinal central plane of the vehicle.

22. In a power vehicle, vehicle wheels, an engine positioned substantially in the central longitudinal plane of the vehicle, a seat positioned between the engine and the driving gear in the longitudinal direction of the vehicle, whose seating surface does not lie higher than the wheel centers, and a drive shaft connecting the engine with the driving gear, which extends lower than the wheel centers, laterally alongside of the seat outside the longitudinal central plane of the vehicle, and obliquely to the longitudinal direction of the vehicle.

23. The combination according to claim 19, in combination with means for guiding the front wheels and means for guiding the rear wheels in such a manner as to produce an inclined axis of transverse oscillation rising from front to rear, which approximately passes through the center of gravity lying beneath the wheel centers.

24. In a power vehicle, vehicle wheels, a frame positioned substantially lower than the wheel centers, an engine having a crank-shaft lying lower than the wheel centers, a driving gear positioned substantially lower than the wheel centers, a seat positioned in the longitudinal direction of the vehicle between the engine and the driving gear, the upper seating surface of which lies substantially lower than the wheel centers, and means for guiding the front wheels and means for guiding the rear wheels in such a manner to produce an inclined axis of transverse oscillation rising from front to rear, which passes approximately through the center of gravity lying beneath the wheel centers.

25. In combination with a power vehicle, a pair of front wheels, means for independently guiding the front wheels relatively to the vehicle in such a manner that they produce a point lying in the vicinity of the ground through which the axis of transverse oscillation of the vehicle extends, a pair of rear wheels, a stiff axle interconnecting the same, guiding means for guiding the stiff axle relatively to the vehicle in such a manner that they produce a point lying at least at the height of the wheel centers through which the axis of transverse oscillation of the vehicle passes, so that there finally results an axis of transverse oscillation for the vehicle rising from the front to the rear, the masses of the vehicle lying so deeply that the center of gravity lies lower than the wheel centers and in the vicinity of the axis of transverse oscillation.

26. In a power vehicle, a frame, an engine, a driving gear, a seat positioned centrally in the transverse direction of the vehicle and mounted between the engine and the driving gear, with a seating surface which lies substantially at the height of the frame, and a drive shaft connecting the engine with the driving gear, which extends beneath the frame.

27. In a power vehicle, the combination according to claim 26 wherein said drive shaft runs laterally alongside the seat, outside of the central longitudinal plane of the vehicle.

28. In a power vehicle, a frame, an engine lying substantially in the central longitudinal plane of the vehicle, a driving gear, a seat positioned in the longitudinal direction of the vehicle between the engine and the driving gear, with a seating surface which lies substantially at the height of the frame, and a drive shaft connecting the engine with the driving gear, which extends beneath the frame, laterally alongside the seat, and obliquely to the longitudinal direction of the vehicle.

29. In a power vehicle, a frame, an engine, a driving gear, a seat positioned in the longitudinal direction of the vehicle between the engine and the driving gear, with a seating surface which lies substantially at the height of the frame, and a drive shaft connecting the engine with the driving gear, which extends beneath the frame and passes laterally alongside the seat outside of the central longitudinal plane of the vehicle, said driving gear consisting of an axle drive positioned substantially in the central longitudinal plane of the vehicle, and a speed-change drive bridging the space between the laterally displaced end of the drive shaft and the axle drive.

30. In a power vehicle, a frame, an engine, a driving gear, a seat positioned in the longitudinal direction of the vehicle between the engine and the driving gear, with a seating surface which lies substantially at the height of the frame, and a drive shaft connecting the engine with the driving gear, which extends beneath the frame and passes laterally along the seat outside the central longitudinal plane of the vehicle, said driving gear consisting of an axle drive positioned substantially in the longitudinal central plane of the vehicle at the height of the wheel centers, and a speed-change drive which bridges the space between the laterally displaced end of the drive shaft, lower than the wheel centers, and the axle drive.

31. In a power vehicle, vehicle wheels, an engine, a transmission, and a drive shaft connecting the engine with the transmission, positioned laterally outside of the longitudinal central plane of the vehicle and lower than the wheel centers, said transmission including an axle drive positioned substantially in the central longitudinal plane of the vehicle and substantially at the height of the wheel centers, and a change-speed drive bridging the space between the drive shaft and the axle drive.

32. The combination according to claim 31, in combination with a seat for said vehicle so positioned that the drive shaft extends laterally alongside the same.

33. In a power vehicle, vehicle wheels, an engine, a transmission, a seat positioned between the engine and the transmission in the longitudinal direction of the vehicle, a drive shaft connecting the engine with the transmission and passing laterally by the seat, the engine, transmission and seat being positioned in such a manner that the center of gravity of the vehicle lies below the wheel centers, and means for guiding the front wheels and means for guiding the rear wheels in such a manner that the transverse swinging axis rising from front to rear is produced, which passes approximately through the center of gravity and lower than the wheel centers.

34. The combination according to claim 33, in which the engine, transmission, seat and drive shaft are positioned substantially below the wheel centers.

MAX WAGNER.